United States Patent
Wu et al.

(10) Patent No.: US 8,564,995 B2
(45) Date of Patent: Oct. 22, 2013

(54) METHOD FOR CONTROLLING THREE-PHASE CURRENT CONVERTER

(75) Inventors: Tsai-Fu Wu, Chiayi County (TW);
Chih-Hao Chang, Tainan (TW);
Li-Chiun Lin, Taoyuan County (TW);
Yu-Kai Chen, Chiayi (TW)

(73) Assignee: National Chung Cheng University, Chiayi County (TW)

( * ) Notice: Subject to any disclaimer, the term of this patent is extended or adjusted under 35 U.S.C. 154(b) by 245 days.

(21) Appl. No.: 13/240,146

(22) Filed: Sep. 22, 2011

(65) Prior Publication Data
US 2012/0224403 A1 Sep. 6, 2012

(30) Foreign Application Priority Data
Mar. 2, 2011 (TW) ............... 100106934 A

(51) Int. Cl.
*H02M 7/44* (2006.01)
*H02M 7/5387* (2007.01)

(52) U.S. Cl.
USPC ........................................... 363/98; 363/132

(58) Field of Classification Search
USPC ................. 363/17, 98, 132; 323/906
See application file for complete search history.

(56) References Cited

U.S. PATENT DOCUMENTS

| | | | |
|---|---|---|---|
| 6,466,465 B1 * | 10/2002 | Marwali | 363/41 |
| 6,545,887 B2 | 4/2003 | Smedley et al. | |
| 8,406,021 B2 * | 3/2013 | Green | 363/89 |

* cited by examiner

*Primary Examiner* — Bao Q Vu
*Assistant Examiner* — Zekre Tsehaye
(74) *Attorney, Agent, or Firm* — Rosenberg, Klein & Lee

(57) ABSTRACT

A method is for controlling a three-phase current converter. First, subtract a second reference current signal representing the predicted current of the three-phase terminals in the present switching cycle from a first reference current signal representing the predicted current of the three-phase terminals in the next switching cycle to obtain a predicted variation. Then, subtract a feedback current signal representing the feedback current of the three-phase terminals in the previous switching cycle from the second reference current signal delayed by one switching cycle to obtain a current error. Multiply the current error by an error coefficient then add the predicted variation to obtain a current variation. Finally, obtain duty ratios of a plurality of switches, according to the current variation and inductance of the first to the third inductor. The three-phase current converter converts electric power between a DC terminal and the three-phase terminals, according to the duty ratio.

10 Claims, 8 Drawing Sheets

METHOD FOR CONTROLLING THREE-PHASE CURRENT CONVERTER

BACKGROUND OF THE INVENTION

1. Field of the Invention

The present invention relates to a method for controlling current; in particular, to a method for controlling a three-phase current converter and device thereof.

2. Description of Related Art

Solar energy is a type of green energy that is virtually inexhaustible; therefore technology associated with the development of solar energy is currently in full swing. When a solar power device (i.e. solar panel) converts solar energy into electrical energy, this electrical energy can be directly incorporated into a city's local utility distribution network or stored within batteries. However, the lifespan of batteries are limited, and so the associated cost is relatively high. If a current converter is utilized, so that the solar energy is transformed into electrical energy, then the electrical energy can be directly incorporated into a city's local utility distribution network, thereby reduce the energy consumption during transmission and reduce power losses, resulting in a more efficient power generation system. In addition, the current converter can also be designed with two-way function, so that solar energy can selectively be supplied to DC loads directly, without the need to go through the distribution network into the city merely for the purpose of conversion into DC power, and this direct supply can minimize roughly 8% of power wastage. In regard to the options of two-way converter, system of 10 kW or more are primarily based on a three-phase design, as shown in FIGS. 1A and 1B, and can be categorized as either a delta connection three-phase current converter or a wye connection three-phase current converter, which better matches future power supply needs and system expansion. The control and reliability of three-phase current converter is an important issue for future research.

Traditional three-phase controlling method mainly utilizes space vector pulse width modulation (SVPWM) as the basis for developing current controller, based on reference, "M. P. Kazmierkowski and L. Malesani, Current Control Techniques for Three-Phase Voltage-Source PWM Converters: A Survey, IEEE trans, on Industrial Electronics, vol. 45, no. 5, pp. 691-703, October 1998". However, according to references, "S. Fukuda and R. Imamura, Application of a Sinusoidal Internal Model to Current Control of Three-Phase Utility-Interface Converters, IEEE Trans. On Industrial Electronics, vol. 52, no. 2, pp. 420-426, March. 2005" and "Q. Zeng and L. Chang, An Advanced SVPWM-Based Predictive Current Control for three-Phase Inverters in Distribution Generation Systems, IEEE Trans. On Industrial Electronics, vol. 55, no. 3, pp. 1235-1246, March. 2008" SVPWM is based on the condition of balanced three-phase voltage, and from that basis current error compensation is utilized to overcome issues such as harmonic distortion from a city's electric utility or control problems from sampling delays. Furthermore, according to reference, "K. M. Smedley and C. Qiao, Unified constant-frequency integration control of three-phase power factor corrected rectifiers, active power filters and grid-connected inverters, U.S. Pat. No. 6,545,887, Apr. 8, 2003", K. M. Smedley proposed dual-buck control method to simplify complicated derivation resulting from traditional SVPWM however such derivation is still based on condition of a balanced three-phase inductance.

It should be noted; three-phase inductance value is not a constant value that is unchanging, see FIG. 2 which shows a diagram of inductance variation vs. current for a magnetic moly-permalloy powder core (MPP core) winding of a 10 kW three-phase system. As shown by FIG. 2, the greater the power within a system, the current is correspondingly greater, and so the inductance is correspondingly smaller. Thereby since a SVPWM is based on condition of a balanced three-phase inductance for directing and deriving controlling method, so when inductance changes due to variance in current, the directing and deriving controlling method for a SVPWM would fail to establish.

If a controller does not take into account of the variance of inductance, then massive compensation must be made to overcome the lack of inductance value, so that such a system would be at risk of divergence. Therefore, a controlling method that accounts for inductance variation is necessary. Additionally, for a general current converter controller, feedback sampling is often interfered by noises generated from switching of switches, resulting in controller oscillating or false action. Although one can use an analog filter to remove high frequency noise, such solution would result in delay of feedback signal and subsequently lead to a slower system response, so that the AC output of the current converter becomes distorted. Thereby in recent years relevant industry begins utilizing digital signal processor (DSP) for pulse width modulation control, so as to retrieve multiple feedback signal samples within one switching cycle for averaging, so as to reduce the effect of high frequency noise. However, multiple sampling does not actually match feedback current value to reference current value, but rather increases DSP processing and calculation time.

SUMMARY OF THE INVENTION

The object of the present invention is to resolve the aforementioned issues of inductance variance and feedback sampling; the present invention provides a three-phase predictive current controlling method. Such controlling method evaluates changes of inductance, and further simplify traditional switching method of SVPWM, so that for the 6 phase intervals of 0~360°, only one arm of every leg of the full bridge switch is switched, thereby replacing the traditional complementary switching method of SVPWM which switches an upper arm and a lower arm of every leg.

In order to achieve the aforementioned objects, according to an embodiment of the present invention, a three-phase current converter controlling method is provided for execution within a three-phase current converter controlling device; the three-phase current converter controlling device is for controlling a three-phase current converter; the three-phase current converter comprises a first inductor, a second inductor, and a third inductor respectively located in the first phase, the second phase, and the third phase; the three-phase current converter controlling method comprises the following steps: first, subtract a second reference current signal representing the predicted current of the three-phase current converter's three-phase terminals in the present switching cycle from a first reference current signal representing the predicted current of the three-phase current converter's three-phase terminals in the next switching cycle to obtain a predicted variation value; next, subtract a feedback current signal representing the feedback current of the three-phase current converter's three-phase terminals in the previous switching cycle from the second reference current signal delayed by one switching cycle so as to obtain a current error value; then multiply the current error value by an error coefficient and then add the predicted variation value to obtain a current variation value; finally, obtain duty ratios of a plurality of switches of the three-phase current converter, according to the current variation value and a first inductance of the first inductor, a second inductance of the second inductor, and a third inductance of the third inductor; wherein the three-phase current converter converts electrical power between a DC terminal and the three-phase terminals of the three-phase current converter according to duty ratios of the plurality of switches.

In order to achieve the aforementioned objects, according to an embodiment of the present invention, a three-phase current converter controlling device is further provided for controlling a three-phase current converter; the three-phase current converter comprises a first inductor, a second inductor, and a third inductor respectively located in the first phase, the second phase, and the third phase; the three-phase current converter controlling device comprises a driving circuit, a first feedback circuit, a second feedback circuit, and a microprocessor. The driving circuit is for driving the three-phase current converter. The first feedback circuit is for receiving the current and voltage of the three-phase terminals of the three-phase current converter, wherein the first feedback circuit is for generating a feedback current signal according to the current of the three-phase terminals of the three-phase current converter. The second feedback circuit is for receiving the voltage at a DC terminal of the three-phase current converter. The microprocessor is for receiving the feedback current signal, the voltage of the three-phase terminals of the three-phase current converter, and the DC terminal voltage. The microprocessor subtract a second reference current signal representing the predicted current of the three-phase current converter's three-phase terminals in the present switching cycle from a first reference current signal representing the predicted current of the three-phase current converter's three-phase terminals in the next switching cycle to obtain a predicted variation value. Next, the microprocessor subtract a feedback current signal representing the feedback current of the three-phase current converter's three-phase terminals in the previous switching cycle from the second reference current signal delayed by one switching cycle so as to obtain a current error value. The microprocessor then multiplies the current error value by an error coefficient and then adds the predicted variation value to obtain a current variation value. Finally, the microprocessor obtains duty ratios of a plurality of switches of the three-phase current converter according to the current variation value and a first inductance of the first inductor, a second inductance of the second inductor, and a third inductance of the third inductor. Wherein the three-phase current converter converts electrical power between the DC terminal and the three-phase terminals of the three-phase current converter according to duty ratios of the plurality of switches.

In summary, the present invention provides a three-phase current converter controlling method and device thereof that takes into account of the inductance variation for each inductor in each phase of the three-phase current converter, and thereby reduces digital signal processor processing and calculation time.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1A:
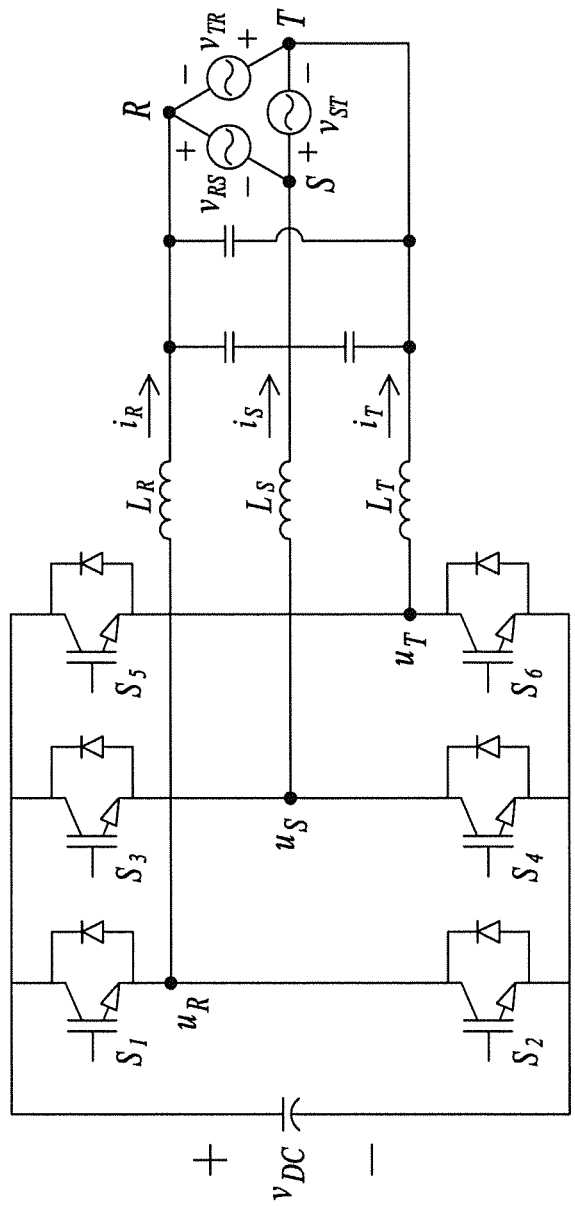
FIG. 1A shows a circuit diagram of a delta connection three-phase current converter.
Figure 1B:
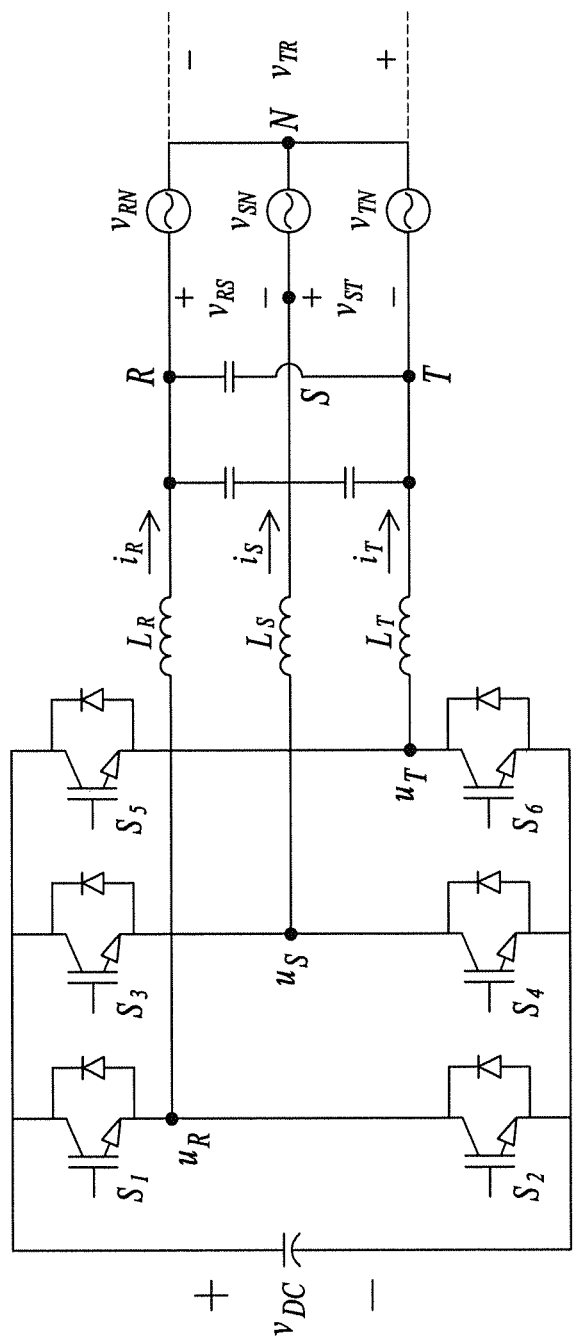
FIG. 1B shows a circuit diagram of a wye connection three-phase current converter.
Figure 2:
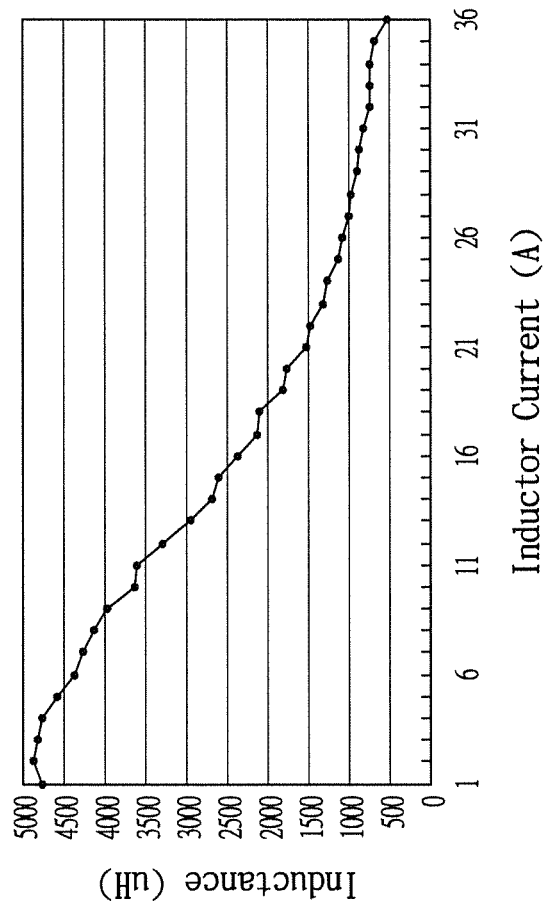
FIG. 2 shows a diagram of inductance variation vs. current for a magnetic moly-permalloy powder (MPP) core winding of a 10 kW three-phase system.
Figure 3:
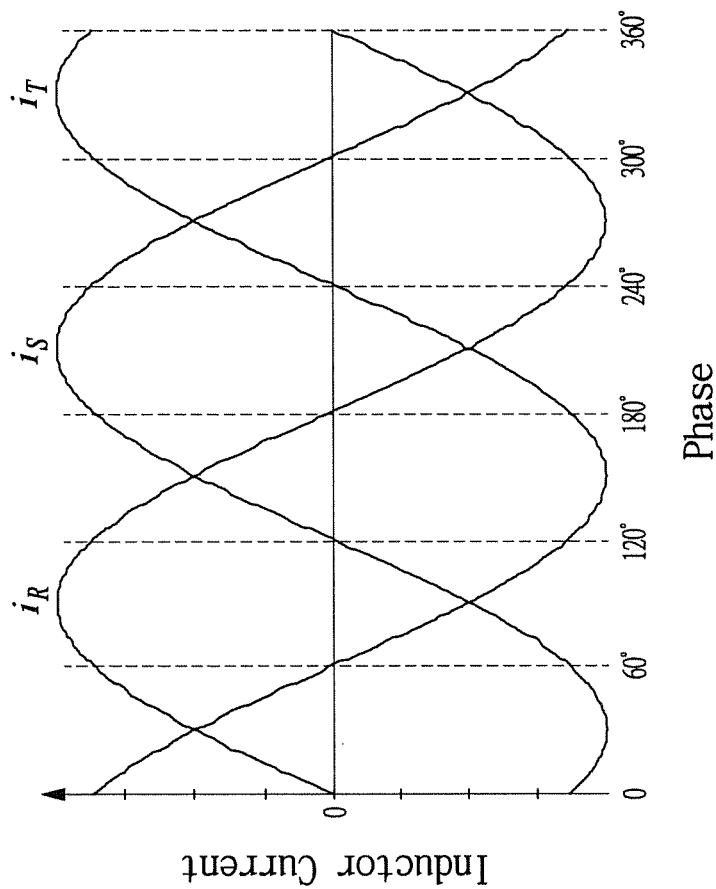
FIG. 3 shows a current waveform diagram of a three-phase inductance within one cycle of a public utility.

According to an embodiment of the present invention, a three-phase current converter controlling method is provided for execution within a three-phase current converter controlling device; the three-phase current converter controlling device is for controlling a three-phase current converter. For ease of explanation, prior to the detailed description of the three-phase current converter controlling method of the present invention, the characteristic equations utilized for controlling the three-phase current converter is first described. Please simultaneously reference FIGS. 1 and 3, FIG. 3 shows a current waveform diagram of a three-phase inductance within one cycle of a public utility (i.e. 60 Hz). According to the zero-crossing of the three-phase current, the phase from 0°-360° can be divided into 6 phase intervals, respectively being interval 0°~360°, 60°~120°, 120°~180°, 180°~240°, 240°~300°, and 300°~360°, and the characteristic equations is segmented via these 6 intervals.

Due to the fact that the three-phase current converter controlling method has two modes, respectively being a grid-connected mode and a rectifying and power factor correction mode. The grid-connected mode provides electrical power from a DC terminal of the three-phase current converter to a three-phase terminal of the three-phase current converter (this three-phase terminal is coupled to the public utility grid), so that electrical power converts from the DC terminal $V_{DC}$ of FIGS. 1A and 1B into the three-phase terminal R, S, and T; the rectifying and power factor correction mode provides electrical power of the three-phase terminal to the DC terminal, so that electrical power converts from the three-phase terminal R, S, T of FIGS. 1A and 1B into the DC terminal $V_{DC}$. The grid-connected mode and the rectifying and power factor correction mode respectively correspond to the following described first characteristic equation (A) and second characteristic equation (B).

First Characteristic Equation (A):
within interval 0°~60°, $$\begin{bmatrix} D_{RH} \\ D_{SL} \\ D_{TH} \end{bmatrix} = \begin{bmatrix} \frac{(L_R+L_S)\Delta i_{L(R)}+L_S\Delta i_{L(T)}}{v_{DC}\cdot T_S} \\ 0 \\ \frac{(L_T+L_S)\Delta i_{L(T)}+L_S\Delta i_{L(R)}}{v_{DC}\cdot T_S} \end{bmatrix} + \begin{bmatrix} \frac{v_{RS}}{v_{DC}} \\ 1 \\ -\frac{v_{ST}}{v_{DC}} \end{bmatrix}$$

within interval 60°~120°, $$\begin{bmatrix} D_{RH} \\ D_{SL} \\ D_{TL} \end{bmatrix} = \begin{bmatrix} 0 \\ \frac{(L_S+L_R)\Delta i_{L(S)}+L_R\Delta i_{L(T)}}{v_{DC}\cdot T_S} \\ \frac{(L_T+L_R)\Delta i_{L(T)}+L_R\Delta i_{L(S)}}{v_{DC}\cdot T_S} \end{bmatrix} + \begin{bmatrix} 1 \\ \frac{v_{RS}}{v_{DC}} \\ -\frac{v_{TR}}{v_{DC}} \end{bmatrix}$$

within interval 120°~180°, $$\begin{bmatrix} D_{RH} \\ D_{SH} \\ D_{TL} \end{bmatrix} = \begin{bmatrix} \frac{(L_R+L_T)\Delta i_{L(R)}+L_T\Delta i_{L(S)}}{v_{DC}\cdot T_S} \\ \frac{(L_S+L_T)\Delta i_{L(S)}+L_T\Delta i_{L(R)}}{v_{DC}\cdot T_S} \\ 0 \end{bmatrix} + \begin{bmatrix} -\frac{v_{TR}}{v_{DC}} \\ \frac{v_{ST}}{v_{DC}} \\ 1 \end{bmatrix}$$

within interval 180°~240°, $$\begin{bmatrix} D_{RL} \\ D_{SH} \\ D_{TL} \end{bmatrix} = \begin{bmatrix} \frac{(L_R+L_S)\Delta i_{L(R)}+L_S\Delta i_{L(T)}}{v_{DC}\cdot T_S} \\ 0 \\ \frac{(L_T+L_S)\Delta i_{L(T)}+L_S\Delta i_{L(R)}}{v_{DC}\cdot T_S} \end{bmatrix} + \begin{bmatrix} -\frac{v_{RS}}{v_{DC}} \\ 1 \\ \frac{v_{ST}}{v_{DC}} \end{bmatrix}$$

within interval 240°~300°, $$\begin{bmatrix} D_{RL} \\ D_{SH} \\ D_{TH} \end{bmatrix} = \begin{bmatrix} 0 \\ \frac{(L_S+L_R)\Delta i_{L(S)}+L_R\Delta i_{L(T)}}{v_{DC}\cdot T_S} \\ \frac{(L_T+L_R)\Delta i_{L(T)}+L_R\Delta i_{L(S)}}{v_{DC}\cdot T_S} \end{bmatrix} + \begin{bmatrix} 1 \\ \frac{v_{RS}}{v_{DC}} \\ -\frac{v_{TR}}{v_{DC}} \end{bmatrix}$$

within interval 300°~360°, $$\begin{bmatrix} D_{RL} \\ D_{SL} \\ D_{TH} \end{bmatrix} = \begin{bmatrix} \frac{(L_R+L_T)\Delta i_{L(R)}+L_T\Delta i_{L(S)}}{v_{DC}\cdot T_S} \\ \frac{(L_S+L_T)\Delta i_{L(S)}+L_T\Delta i_{L(R)}}{v_{DC}\cdot T_S} \\ 0 \end{bmatrix} + \begin{bmatrix} \frac{v_{TR}}{v_{DC}} \\ -\frac{v_{ST}}{v_{DC}} \\ 1 \end{bmatrix}$$

Second Characteristic Equation (B):
within interval 0°~60°, $$\begin{bmatrix} D_{RL} \\ D_{SH} \\ D_{TL} \end{bmatrix} = \begin{bmatrix} \frac{(L_R+L_S)\Delta i_{L(R)}+L_S\Delta i_{L(T)}}{v_{DC}\cdot T_S} \\ 0 \\ \frac{(L_T+L_S)\Delta i_{L(T)}+L_S\Delta i_{L(R)}}{v_{DC}\cdot T_S} \end{bmatrix} + \begin{bmatrix} 1-\frac{v_{RS}}{v_{DC}} \\ 0 \\ 1-\left(-\frac{v_{ST}}{v_{DC}}\right) \end{bmatrix}$$

within interval 60°~120°, $$\begin{bmatrix} D_{RL} \\ D_{SH} \\ D_{TH} \end{bmatrix} = \begin{bmatrix} 0 \\ \frac{(L_S+L_R)\Delta i_{L(S)}+L_R\Delta i_{L(T)}}{v_{DC}\cdot T_S} \\ \frac{(L_T+L_R)\Delta i_{L(T)}+L_R\Delta i_{L(S)}}{v_{DC}\cdot T_S} \end{bmatrix} + \begin{bmatrix} 0 \\ 1-\frac{v_{RS}}{v_{DC}} \\ 1-\left(-\frac{v_{TR}}{v_{DC}}\right) \end{bmatrix}$$

within interval 120°~180°, $$\begin{bmatrix} D_{RL} \\ D_{SL} \\ D_{TH} \end{bmatrix} = \begin{bmatrix} \frac{(L_R+L_T)\Delta i_{L(R)}+L_T\Delta i_{L(S)}}{v_{DC}\cdot T_S} \\ \frac{(L_S+L_T)\Delta i_{L(S)}+L_T\Delta i_{L(R)}}{v_{DC}\cdot T_S} \\ 0 \end{bmatrix} + \begin{bmatrix} 1-\left(-\frac{v_{TR}}{v_{DC}}\right) \\ 1-\frac{v_{ST}}{v_{DC}} \\ 0 \end{bmatrix}$$

within interval 180°~240°, $$\begin{bmatrix} D_{RH} \\ D_{SL} \\ D_{TH} \end{bmatrix} = \begin{bmatrix} \frac{(L_R+L_S)\Delta i_{L(R)}+L_S\Delta i_{L(T)}}{v_{DC}\cdot T_S} \\ 0 \\ \frac{(L_T+L_S)\Delta i_{L(T)}+L_S\Delta i_{L(R)}}{v_{DC}\cdot T_S} \end{bmatrix} + \begin{bmatrix} 1-\left(-\frac{v_{RS}}{v_{DC}}\right) \\ 0 \\ 1-\frac{v_{ST}}{v_{DC}} \end{bmatrix}$$

within interval 240°~300°, $$\begin{bmatrix} D_{RH} \\ D_{SL} \\ D_{TL} \end{bmatrix} = \begin{bmatrix} 0 \\ \frac{(L_S+L_R)\Delta i_{L(S)}+L_R\Delta i_{L(T)}}{v_{DC}\cdot T_S} \\ \frac{(L_T+L_R)\Delta i_{L(T)}+L_R\Delta i_{L(S)}}{v_{DC}\cdot T_S} \end{bmatrix} + \begin{bmatrix} 0 \\ 1-\frac{v_{RS}}{v_{DC}} \\ 1-\left(-\frac{v_{TR}}{v_{DC}}\right) \end{bmatrix}$$

within interval 300°~360°, $$\begin{bmatrix} D_{RH} \\ D_{SH} \\ D_{TL} \end{bmatrix} = \begin{bmatrix} \frac{(L_R+L_T)\Delta i_{L(R)}+L_T\Delta i_{L(S)}}{v_{DC}\cdot T_S} \\ \frac{(L_S+L_T)\Delta i_{L(S)}+L_T\Delta i_{L(R)}}{v_{DC}\cdot T_S} \\ 0 \end{bmatrix} + \begin{bmatrix} 1-\frac{v_{TR}}{v_{DC}} \\ 1-\left(-\frac{v_{ST}}{v_{DC}}\right) \\ 0 \end{bmatrix}$$

wherein the $\Delta i_L$ is the current variation value, and the $T_S$ is the switching cycle.

Figure 4:
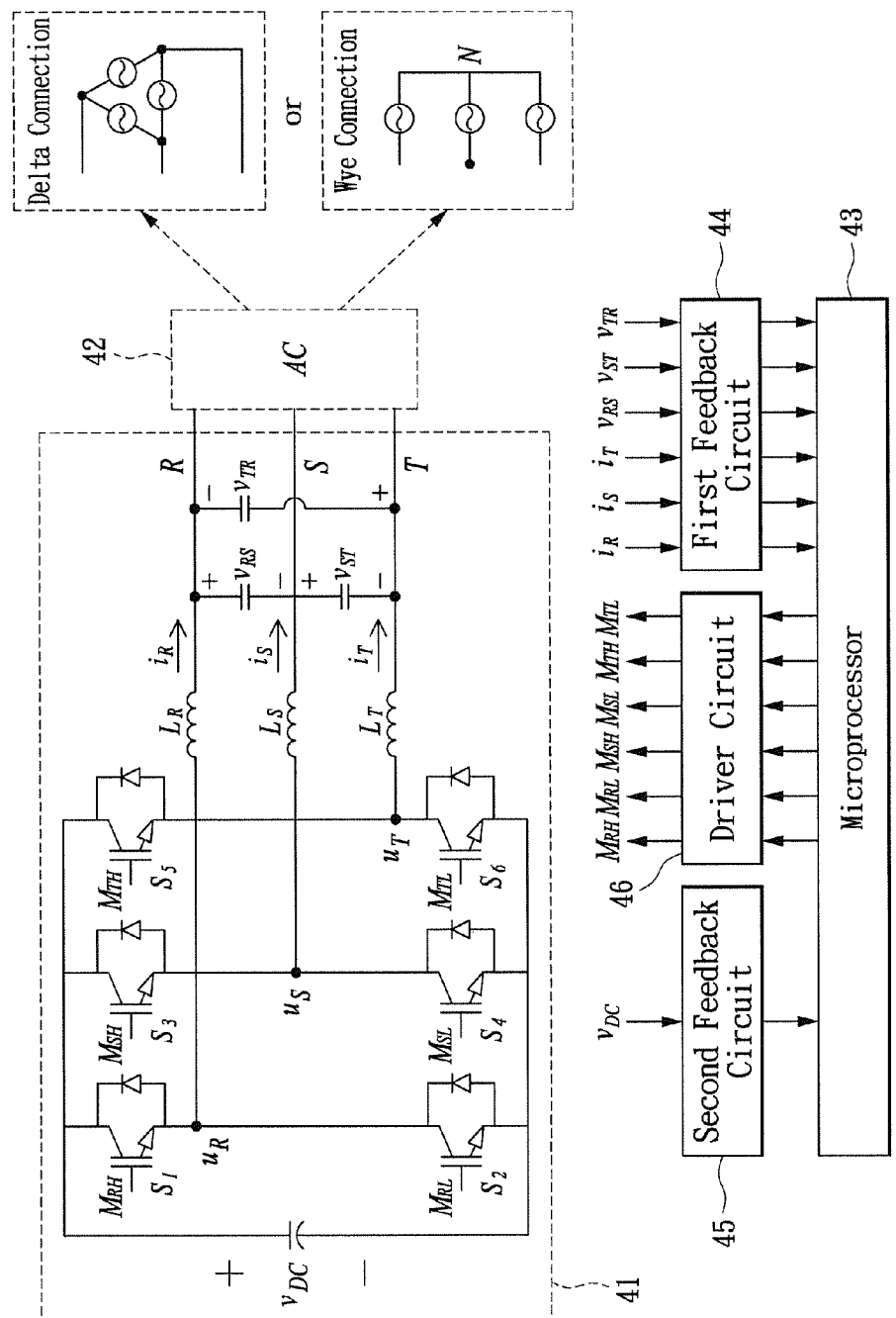
FIG. 4 shows a block diagram of a three-phase current converter controlling device according to an embodiment of the present invention.

For ease of explanation, prior to describing an embodiment of the three-phase current converter controlling method of the present invention, please simultaneously reference FIG. 4, the first characteristic equation (A) and the second characteristic equation (B), so as to understand the basic concept of the three-phase current converter controlling method of the present invention embodiment. FIG. 4 shows a block diagram of a three-phase current converter controlling device according to an embodiment of the present invention. The three-phase current converter controlling device 4 comprises a three-phase current converter 41, a microprocessor 43, a first feedback circuit 44, and a second feedback circuit 45, a driving circuit 46, and shows a public utility grid 42. The three-phase current converter 41 comprises switches $S_1$~$S_6$ forming a full bridge structure, the DC terminal $V_{Dc}$ coupled to the switches, three-phase terminals R, S, T, and inductors $L_R$, $L_S$, $L_T$ that respectively corresponds to the three-phase terminals R, S, T.

The three-phase current converter 41 converters electrical power between the DC terminal $V_{Dc}$ and the three-phase terminals R, S, T. Duty ratios of the switches $S_1$~$S_6$ for the three-phase current converter 41 respectively corresponds to $D_{RH}$, $D_{RL}$, $D_{SH}$, $D_{SL}$, $D_{TH}$, and $D_{TL}$ of the first characteristic equation (A) and the second characteristic equation (B). The driving circuit 46 transmits control signal $M_{RH}$, $M_{RL}$, $M_{SH}$, $M_{SL}$, $M_{TH}$, and $M_{TL}$ to switches $S_1$~$S_6$ for driving the three-phase current converter 41. The first feedback circuit 44 is for receiving the currents $i_R$, $i_S$, $i_T$ and the voltages $V_{RS}$, $V_{ST}$, $V_{TR}$ from the three-phase terminals R, S, T of the three-phase current converter 41, and to transmit the currents $i_R$, $i_S$ $i_T$ and the voltages $V_{RS}$, $V_{ST}$, $V_{TR}$ to the microprocessor 43, so that the first feedback circuit 44 can generate a feedback current signal $I_{fb}(n)$(not shown) according to the currents $i_R$, $i_S$, $i_T$. The second feedback circuit 45 is for receiving the DC terminal $V_{DC}$ of the three-phase current converter 41. It should be noted that the inductance value of the inductor $L_R$, $L_S$, $L_T$ is not a fixed number.

Reference once again the first characteristic equation (A) and the second characteristic equation (B), the current variation value $\Delta i_L$ within the first characteristic equation (A) and the second characteristic equation (B) comprises a predicted variation value $(I_{ref}(n+1)-I_{ref}(n))$ and a current error value $(I_{ref}(n-1)-I_{fb}(n))$ that are within one switching cycle, as described by the following equation (C):

$$\Delta i_L(n+1) = [I_{ref}(n+1)-I_{ref}(n)] + G_C[I_{ref}(n-1)-I_{fb}(n)]$$

Reference again FIG. 4, for the grid-connected mode, when a solar panel stores electrical power at a load (not shown, the load can be a battery), the load may provide electrical power through the DC terminal $V_{DC}$ and the three-phase terminals R, S, T of the three-phase current converter 41 to the public utility grid 42. In other words, when electrical power is to be converted from the DC terminal $V_{DC}$ to the three-phase terminals R, S, T of the three-phase current converter 41, the current variation value $\Delta i_L$ can be input into the first characteristic equation (A) so as to gain the duty ratio $D_{RH}$, $D_{RL}$, $D_{SH}$, $D_{SL}$, $D_{TH}$, and $D_{TL}$ of the switches $S_1$~$S_6$ of the three-phase current converter 41, and accordingly controls the three-phase current converter 41.

Similarly, for the rectifying and power factor correction mode, the electrical power of the public utility grid 42 can be transmitted to a load connected to the DC terminal $V_{DC}$ through the three-phase current converter 41. In other words, when electrical power is to be converted from the three-phase terminals R, S, T to the DC terminal $V_{DC}$ of the three-phase current converter 41, the current variation value $\Delta i_L$ can be input into the second characteristic equation (B) so as to gain the duty ratio $D_{RH}$, $D_{RL}$ $D_{SH}$, $D_{SL}$, $D_{TH}$, and $D_{TL}$ of the switches $S_1$~$S_6$ of the three-phase current converter 41, and accordingly controls the three-phase current converter 41.

It should be noted, according to the first characteristic equation (A) and the second characteristic equation (B), while within any phase intervals, the switches of the upper or lower arm of the two legs (the two legs respectively corresponds to two of the phases) from the full bridge structure would switch, while the upper or lower arm of the other leg (corresponding to the third phase) remains in conduction. Using phase interval 0°~60° of the first characteristic equation (A) as an example, for a full bridge structure, switches $S_1$ and $S_5$ respectively corresponds to the upper arm of phase R and phase T, and the switches $S_1$ and $S_5$ can switch according to control signal $M_{RH}$ and $M_{TH}$. In other words, the duty ratio $D_{RH}$ and $D_{TH}$ of the switches $S_1$ and $S_5$ is as shown by the first characteristic equation (A); additionally the lower arm of switch $S_4$ that corresponds to phase S remains in conduction according to control signal $M_{SL}$, which is shown by the first characteristic equation (A), at phase interval 0°~60°, where $D_{SL}=1$.

Figure 5:
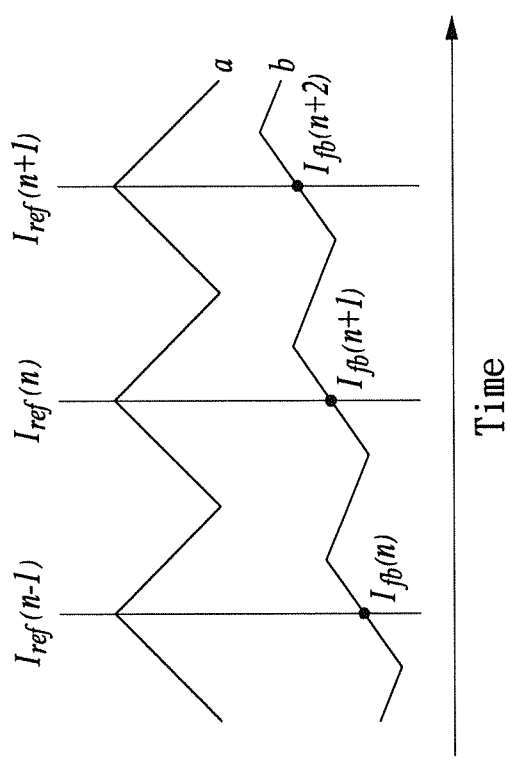
FIG. 5 shows a current waveform diagram of a three-phase inductance according to an embodiment of the present invention.

Next, please reference FIGS. 4 and 5, FIG. 5 shows a current waveform diagram of a three-phase inductance according to an embodiment of the present invention. Microprocessor 43 uses triangle wave as the pulse signal of the switching cycle, and corresponds to reference current $I_{ref}$ of different phases according to a look-up-table stored with the microprocessor 43. Thereby, the duty cycle of switches $S_1$~$S_6$ would be spread out in a symmetrical distribution from the center (peak value) of triangle wave, so that the average value of inductance current $i_R$, $i_S$, $i_T$ within all switching cycle would equal to the reference current $I_{ref}$. Therefore, only a sampling of feedback current $I_{fb}$ at the peak of triangle wave is required to accurately match the feedback current $I_{fb}$ to the reference current $I_{ref}$; and furthermore only one sampling is required. Also sampling at the center (peak value) of the triangle wave, can avoid switching noise generated when a switch is conducted or cut-off. However, for practicality, because an analog filter (not shown) within a first feedback circuit 44 can result in sampling delay for feedback sampling, therefore the analog filter must be designed so that the sampling time is delay by exactly one switching cycle. So, from the perspective of the switching cycle, the current variation value is $I_{ref}(n-1)-I_{fb}(n)$. According to the above explanation, the three-phase current converter controlling method according to an embodiment of the present invention can be arranged into the block diagram as shown by FIG. 6.

Figure 6:
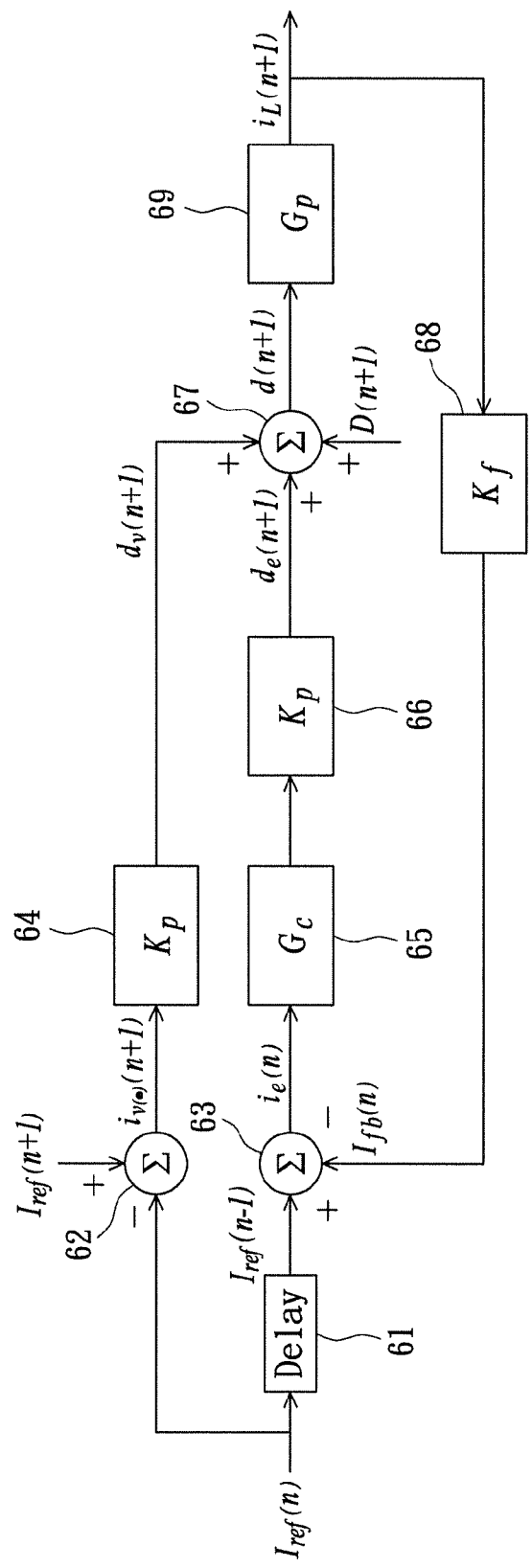
FIG. 6 shows a block diagram of a three-phase current converter controlling method according to an embodiment of the present invention.

Please reference FIGS. 4 and 6, first, utilize adder 62 to subtract the second reference current signal $I_{ref}(n)$ from the first reference current signal $I_{ref}(n+1)$ so as to obtain a predicted variation value $i_{v(\bullet)}(n+1)$. The first reference current signal $I_{ref}(n+1)$ represent the predicted current $i_R$, $i_S$, $i_T$ of the inductors $L_R$, $L_S$, $L_T$ of three-phase current converter's three-phase terminals in the next switching cycle (n+1); and the second reference current signal $I_{ref}(n)$ represent the predicted current $i_R$, $i_S$, $i_T$ of the inductors $L_R$, $L_S$, $L_T$ of the three-phase current converter's three-phase terminals in the present switching cycle (n). Next, delay via one switching cycle the second reference signal $I_{ref}(n-1)$ by utilizing a time delay relay 61, then subtract a feedback current signal $I_{fb}(n)$ from the second reference current signal $I_{ref}(n-1)$ that has been delayed by one switching cycle so as to obtain a current error value $i_e(n)$; wherein according to the aforementioned practical consideration, the way the feedback current signal $I_{fb}(n)$ is generated is via utilizing multiplier 68 to multiply a feedback current signal $I_{fb}(n-1)$ (now shown) with a feedback coefficient $K_P$, then delay by one switching cycle. Next, utilize multiplier 64 to multiply the predicted variation value $i_{v(\bullet)}(n+1)$ with a predicted value coefficient $K_P$ so as to obtain a predicted value $d_v(n+1)$. Then, utilize multiplier 65, 66 to multiply an error variation coefficient $G_C$ and the predicted value coefficient $K_p$ with the feedback current signal $I_{fb}(n)$ so as to obtain an error value $d_e(n+1)$.

Reference both FIGS. 4 and 6, next, utilize adder 67 to add the predicted value $d_v(n+1)$ and the error value $d_e(n+1)$ with a set value $D(n+1)$ so as to obtain a total correction value $d(n+1)$, wherein the set value $D(n+1)$ is the second item to the right of the equal sign of the first characteristic equation (A) and the second characteristic equation (B); in other words, the set value $D(n+1)$ is the value obtained by processing the DC and AC voltage from the first feedback circuit 44 and the second feedback circuit 45 of FIG. 4. Lastly, utilize multiplier 69 to multiply the total correction value $d(n+1)$ with the transfer function G so as to obtain the inductor current from the next switching cycle $i_L(n+1)$; wherein the inductor current $i_L(n+1)$ is the inductor current $i_R$, $i_S$, $i_T$ of the three-phase terminals R, S, T at switching cycle (n+1); and the transfer function $G_P$ represents how the three-phase current converter 41 obtains the inductor current from the next switching cycle $i_L(n+1)$ according to the duty ratio of switches (as obtained via the first characteristic equation (A) and the second characteristic equation (B)). In other words, how the transfer function G process the total correction value d(n+1) represents the first characteristic equation (A) and the second characteristic equation (B).

Figure 7A:
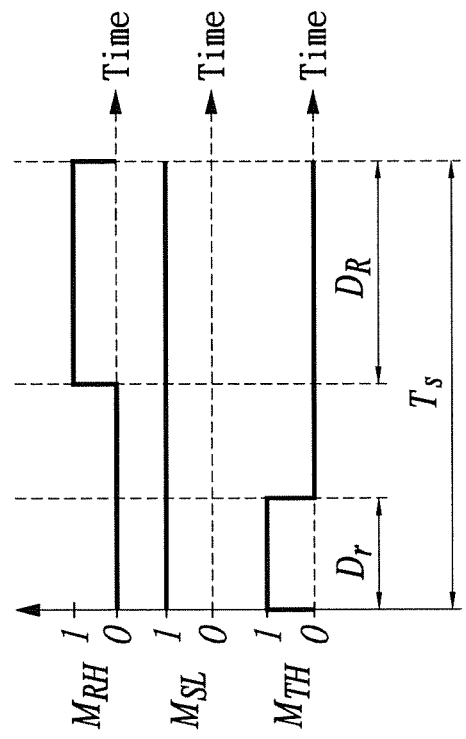
FIG. 7A shows a three-phase switch timing diagram of a three-phase current converter controlling device for one switching cycle according to an embodiment of the present invention.
Figure 7B:
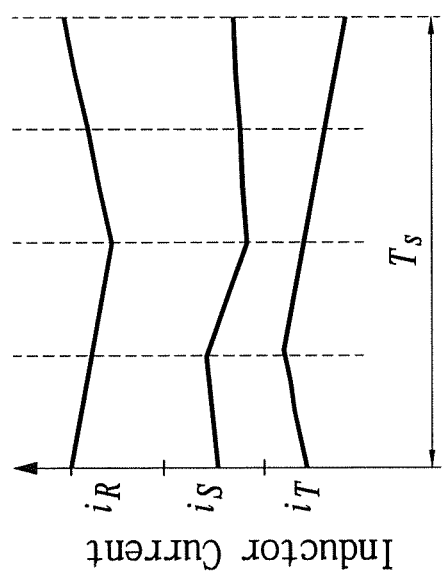
FIG. 7B shows a current waveform diagram of a three-phase inductance of a three-phase current converter controlling device for one switching cycle according to an embodiment of the present invention.

Additionally, switches from different arms of the full bridge structure can utilize interleaving switching. See FIGS. 7A and 7B, FIG. 7A shows the upper arm of phase R and phase T receives control signal $M_{RH}$ and $M_{TH}$ at different time period of the duty cycle; FIG. 7B shows that inductor current $i_R$ and $i_T$ having a complementary relation. Due to the complementary relation between $i_R$ and $i_T$ from the corresponding phase R and T, the ripple from inductor current $i_S$ from the phase S is reduced. Similarly, in order to reduce the ripple from inductor current $i_R$ from the phase R, the upper arms located at phase S and phase T can be configured to receive control signals at different time period of the duty cycle. Additionally, in order to reduce the ripple from inductor current $i_T$ from the phase T, the upper arms located at the phase R and S can also be configured to receive control signals at different time period of the duty cycle. In other words, the switches of any two arms of the full bridge structure can be corresponded to the inductor current of the third arm of the corresponding phase, so as to reduce the current ripple.

According to an embodiment of the present invention, the aforementioned three-phase current converter controlling method allows for inductance variation for inductors located at each phases of the three-phase current converter, thereby simplifies traditional space vector pulse width modulation switching method, therefore for the 6 phase intervals from 0~360°, only one arm of each leg of the full bridge switch is switched, and thus replacing the traditional complementary switching method of SVPWM which switches an upper arm and a lower arm of every leg. Furthermore, only one sampling is required within one duty cycle in order to effectively obtain the average value of the feedback current, so that the processing and calculation time of the digital signal processor is reduced, and at the same time avoiding switching noises generated during switch conduction and cut-off, so that the system can achieve higher stability. Also, the interleaving switching way can be utilized on multi-phase current converter system, thereby reduces the ripple effect of currents.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A three-phase current converter controlling method, for executing within a three-phase current converter controlling device, the three-phase current converter controlling device is for controlling a three-phase current converter, and the three-phase current converter comprises a first inductor, a second inductor and a third inductor respectively located in the first phase, the second phase, and the third phase, the three-phase current converter controlling method comprising:

subtract a second reference current signal representing the predicted current of the three-phase current converter's three-phase terminals in the present switching cycle from a first reference current signal representing the predicted current of the three-phase current converter's three-phase terminals in the next switching cycle so as to obtain a predicted variation value;

delay the second reference current signal by one switching cycle, then subtract a feedback current signal representing the feedback current of the three-phase current converter's three-phase terminals in the previous switching cycle from the second reference current signal that has been delayed by one switching cycle so as to obtain a current error value;

multiply the current error value by an error coefficient, then add the predicted variation value to obtain a current variation value; and obtain duty ratios of a plurality of switches of the three-phase current converter according to the current variation value and a first inductance of the first inductor, a second inductance of the second inductor, and a third inductance of the third inductor;

wherein the three-phase current converter converts electric power between a DC terminal and the three-phase terminals of the three-phase current converter according to duty ratios of the plurality of switches.

2. The three-phase current converter controlling method according to claim 1, wherein the way to obtain duty ratios of the plurality of switches of the three-phase current converter according to the current variation value and the first, second, and third inductance is to input the current variation value into a first characteristic equation or a second characteristic equation.

3. The three-phase current converter controlling method according to claim 1, wherein the plurality of switches of the three-phase current converter is of full bridge structure, and the three-phase current converter controlling method further comprises:

according to a characteristic equation, the three-phase current converter switches the switch of an arm for each leg of the three-phase current converter at each of the phase intervals.

4. The three-phase current converter controlling method according to claim 1, wherein the three-phase current converter controlling method further comprises:

the plurality of switches in the first and second phase of the three-phase current converter switches in an interleaving way, so as to reduce the current ripple of the third inductor.

5. The three-phase current converter controlling method according to claim 1, wherein the three-phase current converter controlling method further comprises:

utilizing triangle wave to generate the switching cycle, and sample the feedback current signal at the peak of the triangle wave, wherein the feedback current signal represents the average current within the switching cycle for the first inductor, the second inductor, or the third inductor.

6. A three-phase current converter controlling device, for controlling a three-phase current converter, and the three-phase current converter comprises a first inductor, a second inductor, and a third inductor respectively located in the first phase, the second phase, and the third phase, the three-phase current converter controlling device comprising:

a driving circuit, for driving the three-phase current converter;

a first feedback circuit, for receiving the current and voltage of the three-phase terminals of the three-phase current converter, wherein the first feedback circuit is for generating a feedback current signal according to the current of the three-phase terminals of the three-phase current converter;

a second feedback circuit for receiving the voltage at a DC terminal of the three-phase current converter; and a microprocessor for receiving the feedback current signal, the voltage of the three-phase terminals of the three-phase current converter, and the voltage at the DC terminal of the three-phase current converter; the microprocessor subtracts a second reference current signal representing the predicted current of the three-phase current converter's three-phase terminals in the present switching cycle from a first reference current signal representing the predicted current of the three-phase current converter's three-phase terminals in the next switching cycle to obtain a predicted variation value; then, the microprocessor subtract a feedback current signal representing the feedback current of the three-phase current converter's three-phase terminals in the previous switching cycle from the second reference current signal delayed by one switching cycle so as to obtain a current error value; next, the microprocessor then multiplies the current error value by an error coefficient and then adds the predicted variation value to obtain a current variation value; finally, the microprocessor obtains duty ratios of a plurality of switches of the three-phase current converter according to the current variation value and a first inductance of the first inductor, a second inductance of the second inductor, and a third inductance of the third inductor;

wherein the three-phase current converter converts electric power between the DC terminal and the three-phase terminals of the three-phase current converter according to duty ratios of the plurality of switches.

7. The three-phase current converter controlling device according to claim 6, wherein the way the microprocessor obtains duty ratios of a plurality of switches of the three-phase current converter according to the current variation value and the first, second, and third inductance is to input the current variation value into a first characteristic equation or a second characteristic equation.

8. The three-phase current converter controlling device according to claim 6, wherein the plurality of switches of the three-phase current converter is of full bridge structure, and according to a characteristic equation, the microprocessor of the three-phase current converter switches the switch of an arm for each leg of the three-phase current converter at each of the phase intervals.

9. The three-phase current converter controlling device according to claim 6, wherein the three-phase current converter controlling device through the driving circuit controls the plurality of switches in the first and second phase of the three-phase current converter switches in an interleaving way, so as to reduce the current ripple of the third inductor.

10. The three-phase current converter controlling device according to claim 6, wherein the three-phase current converter controlling device utilizes triangle wave to generate the switching cycle, and sample the feedback current signal at the peak of the triangle wave, wherein the feedback current signal represents the average current within the switching cycle for the first inductor, the second inductor, or the third inductor.

* * * * *